(12) United States Patent
Liu

(10) Patent No.: US 10,436,333 B2
(45) Date of Patent: Oct. 8, 2019

(54) AIR DISTRIBUTOR

(71) Applicant: FITOK INCORPORATED, Shenzhen (CN)

(72) Inventor: Chao Liu, Shenzhen (CN)

(73) Assignee: FITOK INCORPORATED, Shenzhen, Guangdong (CN)

( * ) Notice: Subject to any disclaimer, the term of this patent is extended or adjusted under 35 U.S.C. 154(b) by 176 days.

(21) Appl. No.: 15/580,264

(22) PCT Filed: Jun. 8, 2017

(86) PCT No.: PCT/CN2017/087614
§ 371 (c)(1),
(2) Date: Dec. 6, 2017

(87) PCT Pub. No.: WO2018/068518
PCT Pub. Date: Apr. 19, 2018

(65) Prior Publication Data
US 2019/0242483 A1      Aug. 8, 2019

(30) Foreign Application Priority Data

Oct. 14, 2016   (CN) .......................... 2016 1 0894324

(51) Int. Cl.
*F16L 41/16* (2006.01)
*F16K 11/10* (2006.01)
*F16L 41/14* (2006.01)

(52) U.S. Cl.
CPC ............. *F16K 11/10* (2013.01); *F16L 41/14* (2013.01); *F16L 41/16* (2013.01); *Y10T 137/87877* (2015.04)

(58) Field of Classification Search
CPC ..... Y10T 137/85938; Y10T 137/87877; Y10T 137/87909
USPC ........................................................ 285/191
See application file for complete search history.

(56) References Cited

U.S. PATENT DOCUMENTS

| 13,832 | A | * | 11/1855 | Thomas ................ F16L 41/086 |
| | | | | 285/191 |
| 45,964 | A | * | 1/1865 | Ball ........................ F16L 41/12 |
| | | | | 285/197 |
| 570,543 | A | * | 11/1896 | Coles et al. .......... F16L 41/086 |
| | | | | 285/191 |

(Continued)

FOREIGN PATENT DOCUMENTS

| CN | 104180115 A | 12/2014 |
| CN | 204345148 U | 5/2015 |

(Continued)

OTHER PUBLICATIONS

International Search Report for PCT/CN2017/087614, dated Sep. 14, 2017.

(Continued)

*Primary Examiner* — John Fox
(74) *Attorney, Agent, or Firm* — Ladas & Parry, LLP

(57) ABSTRACT

An air distributor may include a thin-wall main pipe (10) and branch pipes (48) distributed on the main pipe. The branch pipes may be symmetrically fixed on the main pipe by locking device disposed in the main pipe. Welding is not needed, and disassembly and maintenance are easy. The main pipe is thin-wall pipe, therefore the weight of the device is greatly reduced, and the production cost is decreased.

8 Claims, 4 Drawing Sheets

(56) References Cited

U.S. PATENT DOCUMENTS

| | | | | | |
|---|---|---|---|---|---|
| 587,546 | A | * | 8/1897 | Dillenberg | F16L 41/086 285/191 |
| 1,789,079 | A | * | 1/1931 | Simpson | F16L 19/04 137/317 |
| 1,806,450 | A | * | 5/1931 | Ercanbrack | F24D 3/08 165/157 |
| 3,915,477 | A | | 10/1975 | Timmons | |
| 4,518,033 | A | * | 5/1985 | Gartner | F24D 5/10 165/53 |
| 2009/0289451 | A1 | * | 11/2009 | Oxner | F16L 41/026 285/189 |
| 2016/0061371 | A1 | | 3/2016 | Liu | |

FOREIGN PATENT DOCUMENTS

| | | | |
|---|---|---|---|
| CN | 106439346 | A | 2/2017 |
| DE | 8809436 | U1 | 9/1988 |
| FR | 2556073 | B1 | 7/1986 |
| JP | 084973 | A | 1/1996 |
| KR | 20050120899 | A | 12/2005 |

OTHER PUBLICATIONS

Written Opinion of the International Search Authority for PCT/CN2017/087614, dated Sep. 14, 2017.

\* cited by examiner

AIR DISTRIBUTOR

CROSS REFERENCE TO RELATED APPLICATIONS

This application is the U.S. national phase of PCT Application No. PCT/CN2017/087614 filed on Jun. 8, 2017, which claims priority to Chinese Patent Application No. 201610894324.3 filed on Oct. 14, 2016, the disclosures of which are incorporated herein by reference in their entireties.

TECHNICAL FIELD

The present disclosure relates to storage or distribution of gas or liquid, more specifically to an air distributor.

BACKGROUND

Air distributor is an auxiliary device for air distribution, is a good helper for installing and using pneumatic instruments, and is widely used in electric power, metallurgy, chemical, pharmaceutical, textile and automated assembly line. The air distributor mainly includes a main pipe, branch pipes and valves. Currently, the air distributor produced in the art is basically formed by drilling holes in the outer wall of the main pipes and fixing the branch pipes and the valves on the main pipes by welding, such as shown in an issued Chinese patent CN 204345148 U. It is well known that the shape of the hole drilled in a cylindrical main pipe will be saddle-like shape. The biggest difficulty in connecting the breach pipe to the hole with such shape is the fixation of the branch pipes and the sealing between the branch pipes and the main pipe. Although the air distributor formed by welding has good sealing and can withstand higher pressure in the pipe, there are many drawbacks in practical application. For example, the cost of welding is high, and the device is cumbersome.

In a previously issued Chinese patent CN 104180115 B of the applicant, a fluid shunt device without welding is disclosed, in which, a round hole is arranged in a thin-wall main pipe, a connection joint is passed through the round hole, and a locking member is passed through a square hole below the connection joint from the inner wall of the main pipe, thereby fixing the connection joint on the main pipe. This invention has been successfully applied in the field of fluid shunt, by which, not only the fixation of the branch pipe is achieved, but also good sealing is ensured. However, there is a possibility that replacement and maintenance will be greatly limited when the valve on the branch pipe leaks due to life or other reasons.

SUMMARY

In view of the above deficiencies in the prior art, the present disclosure provides an air distributor which may include a thin-wall main pipe and branch pipes distributed on the main pipe. The main pipe may at least include one inlet and one outlet. Conical holes which are tapered inwardly may be arranged in the outer wall of the main pipe in an axially symmetrical manner. The branch pipe may include a valve. The valve may include an annual conical surface which enters into the conical hole in the outer wall of the main pipe. An end portion of the annual conical surface may be disposed in an inner cavity of the main pipe. The end portion may be provided with a locking hole and flow channel holes surrounding the locking hole. The flow channel holes may be communicated with a main flow channel of the valve. The locking hole may be used to receive a fastener disposed in the inner cavity of the main pipe. The fastener may symmetrically fasten the valve on the main pipe.

Preferably, a groove may be arranged on the annual conical surface where the valve contacts the conical hole of the main pipe.

Preferably, a sealing member may be arranged in the groove.

Preferably, the branch pipe may further include a conical washer. The conical washer may include a conical outer surface cooperating with the conical hole of the main pipe and a conical inner wall cooperating with the annual conical surface of the valve.

Preferably, the fastener may be a hexagon socket head cap screw.

The present disclosure has the advantages that:
1. the main pipe is a thin-wall pipe, and therefore, not only the raw material is saved, but also the overall weight of the device is reduced;
2. the connection between the main pipe and the branch pipe is detachable, and therefore it is easy to be installed, replaced and maintained.

DETAILED DESCRIPTION

In order to facilitate the understanding of the person skilled in the art, the present disclosure will be further described below with reference to the drawings.

Figure 1:
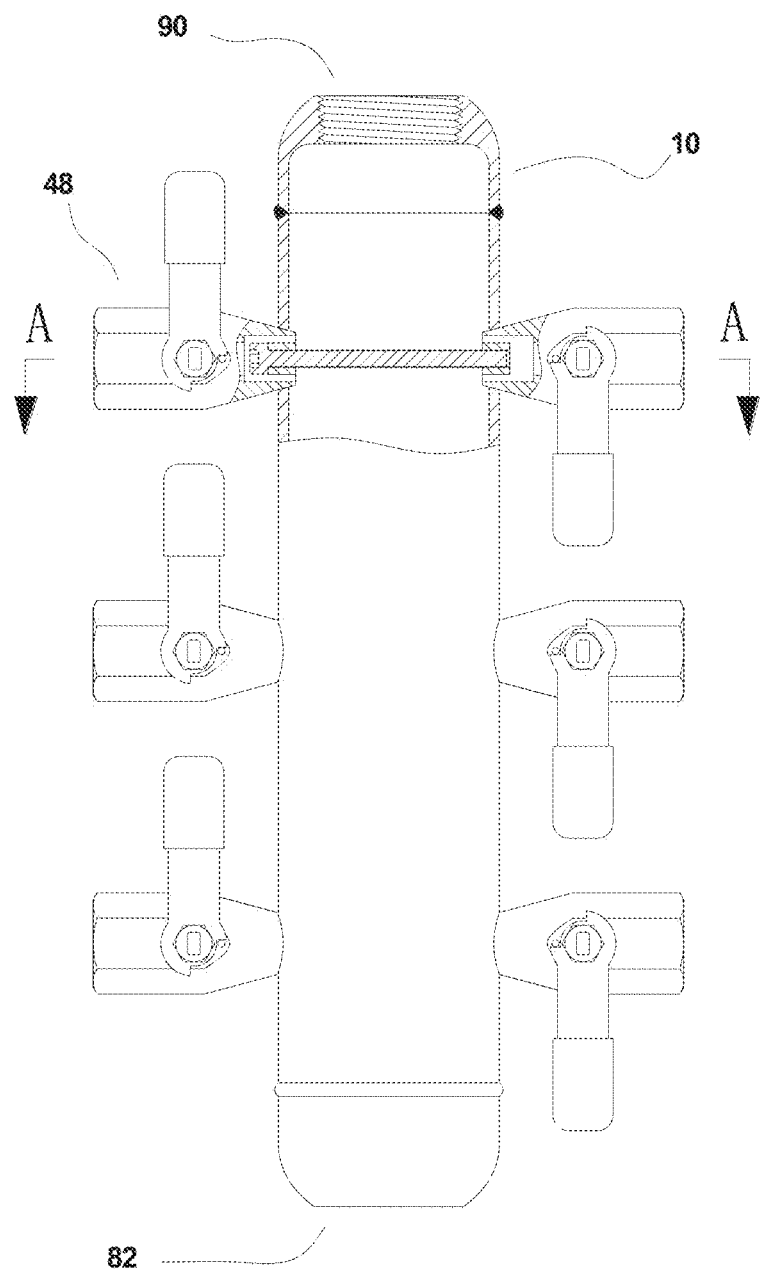
FIG. 1 schematically shows the structure of the air distributor containing the concepts of the present disclosure.

FIG. 1 schematically shows the structure of an air distributor shown in the present disclosure. The air distributor may include a main pipe 10 and branch pipes 48. The main pipe 10 may have a cylindrical outer contour, and have a fluid inlet 90 and a fluid outlet 82. Saddle-shaped conical holes 80 may be arranged on the out wall in an axially symmetrical manner. The conical holes 80 may be tapered inwardly. The branch pipe 48 may include a valve 22. One end of the valve 22 may be formed as an annular conical surface 24 which matches the conical hole 80 on the outer wall of the main pipe. The end portion 26 of the annular conical surface 24 may pass through the conical hole 80 to enter into the inner cavity of the main pipe. A center hole 38 may be arranged in the end portion 26. Flow channel holes 36 may be arranged around the center hole 38. The flow channel holes 36 may be communicated with the main flow channel 30 of the valve 22. According to one aspect of the present disclosure, the main pipe 10 may be made of thin-wall steel pipe, and the thickness of the wall may be limited in 3-5 mm. Therefore, not only the overall weight of the main pipe is greatly reduced and thus the transportation of the whole device is facilitated, but also the raw materials can be saved.

Figure 2:
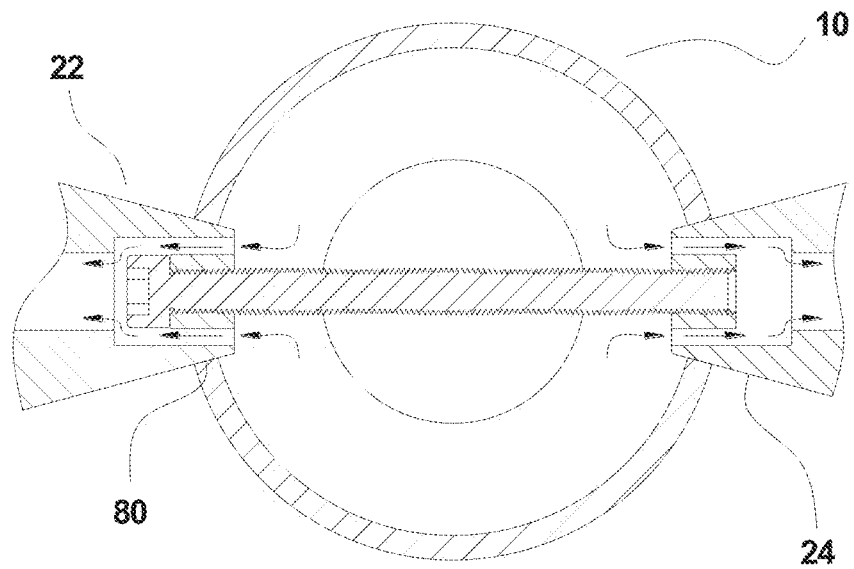
FIG. 2 is a section view along the direction A-A in FIG. 1.
Figure 3:
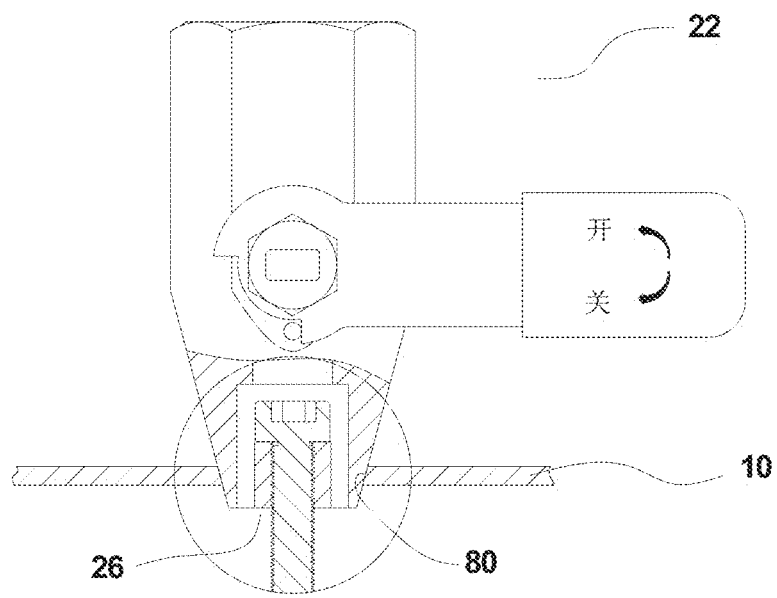
FIG. 3 is an enlarge view of a branch pipe-connection local structure containing the concepts of the present disclosure.
Figure 6:
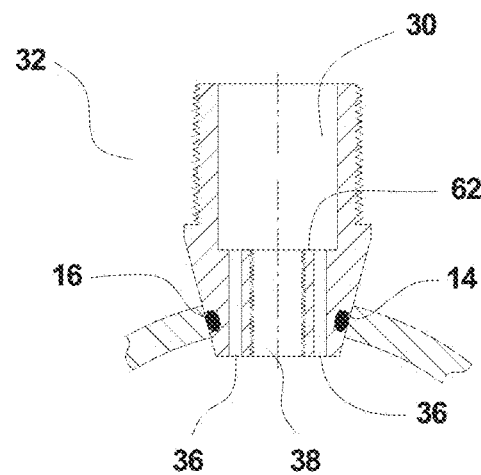
FIG. 6 schematically shows the structure of the split-type branch pipe joint containing the concepts of the present disclosure.
Figure 7:
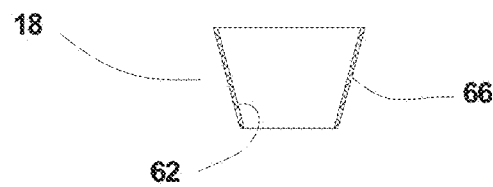
FIG. 7 schematically shows the structure of the washer containing the concepts of the present disclosure.
Figure 8:
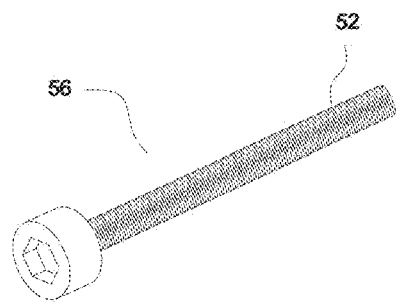
FIG. 8 schematically shows the structure of the fastener containing the concepts of the present disclosure.

Another aspect of the present disclosure relates to the connection between the valve 22 and the main pipe 10. As shown in FIG. 2, the annual conical surface 24 of the valve 22 may pass through the axially symmetrical conical hole 80 in the main pipe. A fastener 56 may pass through the center hole 38 through the main flow channel 30 of the valve until it is inserted into the center hole of the valve in the axially symmetrical direction. As shown in FIG. 6, which shows another form of the connection of the branch pipe, the valve 22 may be fixed to the main pipe 10 by a branch pipe joint 32. The branch pipe joint 32 may be connected with the valve 22 by screw thread. In a preferred embodiment of the present disclosure, the center hole 38 may be formed as a threaded hole, and a step 62 may be formed by the center hole 38 and the main flow channel 30 of the valve. The fastener 56 may be a hexagon socket head cap screw, and may be provided with screw thread 52 cooperating with the center hole 38. The fastener 56 may pass through the both center holes of the valves located in the symmetrical direction until it abuts against the step 62, where the valve 22 is firmly fixed on the main pipe 10. When the branch pipes need to be maintained, the branch pipes may be replaced by detaching the fastener 56 from one end of the valve 22. Therefore, another aspect of the present disclosure relates to the detachable connection between the main pipe and the branch pipe, which is easy to be installed, replaced and maintained. Furthermore, since the fastener is internally disposed in the main pipe, the bloated structure of the branch pipe due to the fastening can be simplified, and more beautiful appearance can be obtained.

Figure 4:
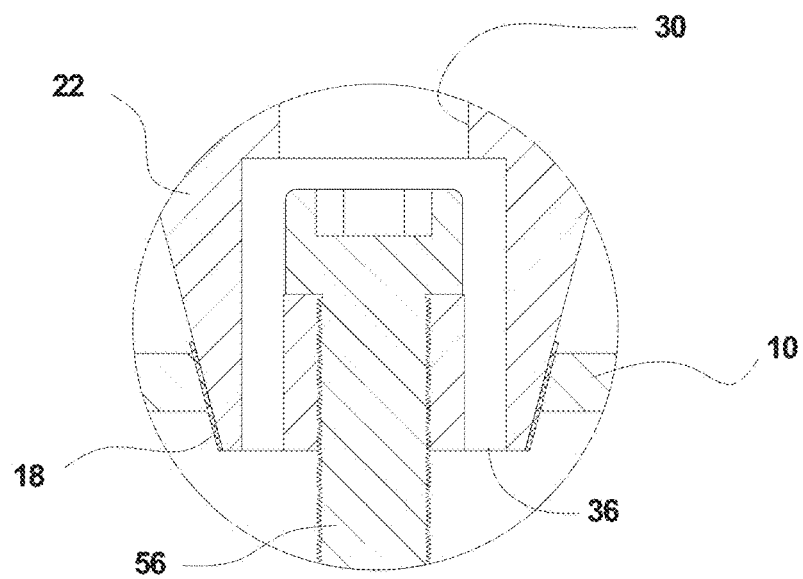
FIG. 4 is an enlarge view of another branch pipe-connection local structure containing the concepts of the present disclosure.
Figure 5:
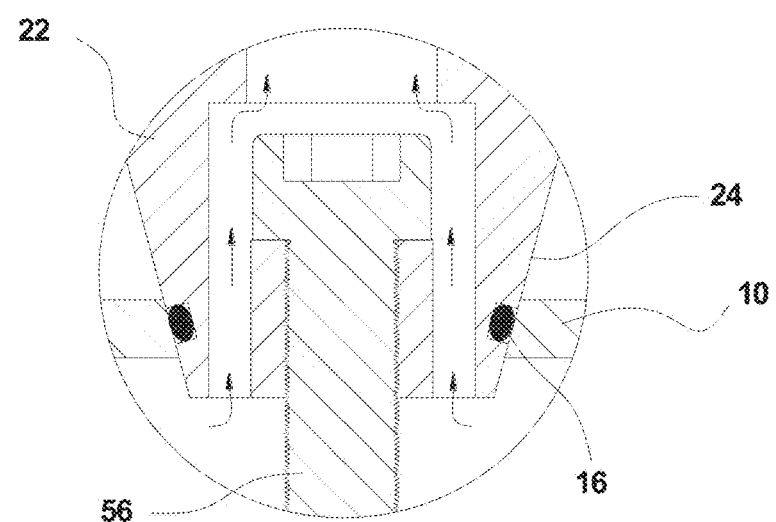
FIG. 5 is an enlarge view of another branch pipe-connection local structure containing the concepts of the present disclosure.

In another preferred embodiment of the present disclosure, a sealing member 16 may be arranged between the annual conical surfaces where the valve 22 and the main pipe 10 are connected with each other. The sealing member 16 may be disposed in an arc-shaped groove 14 located on the annual conical surface 24, as shown in FIG. 5. In another preferred embodiment of the present disclosure, the branch pipe 48 may further include a conical washer 18, as shown in FIG. 4. The washer 18 may have a conical outer wall 66 and a conical inner hole 62. The washer 18 may be arranged between the valve 22 and the main pipe, where the conical outer wall cooperates with the conical hole 80 and the conical inner hole cooperates with the annual conical surface 24 of the valve. The washer may be made of, but not limited to, metal material with good ductility, such as copper, aluminum or the like.

The present disclosure has been described with reference to preferred embodiments. However, the content mentioned in the embodiments above will not limit the present disclosure. Many modifications and variations to the structures may be made by a person skilled in the art by reading the description without departing from the concepts of the present disclosure. Any obvious replacement will fall in the scope of the present disclosure.

The invention claimed is:

1. An air distributor, comprising a thin-wall main pipe and branch pipes distributed on the main pipe, wherein, the main pipe at least comprises one inlet and one outlet, and conical holes which are tapered inwardly are arranged in an outer wall of the main pipe in an axially symmetrical manner, and wherein, the branch pipe comprises a valve, the valve comprises an annular conical surface which enters into the conical hole in the outer wall of the main pipe, an end portion of the annular conical surface is disposed in an inner cavity of the main pipe, the end portion is provided with a locking hole and flow channel holes surrounding the locking hole, the flow channel holes is communicated with a main flow channel of the valve, the locking hole is used to receive a fastener disposed in the inner cavity of the main pipe, and the fastener symmetrically fastens the valve on the main pipe.

2. The air distributor of claim 1, wherein a groove is arranged on the annular conical surface where the valve contacts the conical hole of the main pipe.

3. The air distributor of claim 2, wherein a sealing member is arranged in the groove.

4. The air distributor of claim 3, wherein the fastener is a hexagon socket head cap screw.

5. The air distributor of claim 2, wherein the fastener is a hexagon socket head cap screw.

6. The air distributor of claim 1, wherein, the branch pipe further comprises a conical washer, and the conical washer comprises a conical outer surface cooperating with the conical hole of the main pipe and a conical inner wall cooperating with the annular conical surface of the valve.

7. The air distributor of claim 6, wherein the fastener is a hexagon socket head cap screw.

8. The air distributor of claim 1, wherein the fastener is a hexagon socket head cap screw.

* * * * *